United States Patent
Wall et al.

(10) Patent No.: US 6,919,984 B2
(45) Date of Patent: Jul. 19, 2005

(54) METAL TRIM MIRROR FOR OPTIMIZED THIN FILM RESISTOR LASER TRIMMING

(75) Inventors: Ralph N. Wall, Beaverton, OR (US); Karl Robinson, Beaverton, OR (US)

(73) Assignee: Maxim Integrated Products, Inc., Sunnyvale, CA (US)

(*) Notice: Subject to any disclaimer, the term of this patent is extended or adjusted under 35 U.S.C. 154(b) by 0 days.

(21) Appl. No.: 10/634,010

(22) Filed: Aug. 4, 2003

(65) Prior Publication Data

US 2005/0030632 A1 Feb. 10, 2005

(51) Int. Cl.$^7$ .............................. G02B 26/00; H01S 3/08
(52) U.S. Cl. ........................ 359/291; 359/290; 372/99
(58) Field of Search .............................. 359/290, 291, 359/295, 214, 629, 726; 372/20, 98, 99; 257/536–543, 358–360; 438/238, 382–385

(56) References Cited

U.S. PATENT DOCUMENTS

| | | | | |
|---|---|---|---|---|
| 3,585,461 A | * | 6/1971 | Eynon et al. | 257/751 |
| 6,242,792 B1 | * | 6/2001 | Miura et al. | 257/536 |
| 6,680,791 B2 | * | 1/2004 | Demir et al. | 359/248 |
| 2002/0102806 A1 | * | 8/2002 | Bailey et al. | 438/384 |
| 2002/0126265 A1 | * | 9/2002 | Okura et al. | 353/98 |
| 2003/0123125 A1 | * | 7/2003 | Little | 359/290 |

* cited by examiner

Primary Examiner—Georgia Epps
Assistant Examiner—M. Hasan
(74) Attorney, Agent, or Firm—Blakely, Sokoloff, Taylor & Zafman LLP

(57) ABSTRACT

A device and a method of forming the device are disclosed. The device includes a reflector, a first dielectric layer disposed on the reflector, and a thin film resistor disposed on the reflector. The reflector acts as a barrier between the thin film resistor and an underlying dielectric layer which may have a non-uniform thickness. Thus, the thickness control and uniformity of the dielectric layer underlying the reflector does not affect the laser trimming of the thin film resistor. In addition to serving as a barrier, the reflector reflects the trimming laser energy back towards the thin film resistor, thereby improving the efficiency of the laser trimming of the thin film resistor. Furthermore, the thickness of the first dielectric layer situated below the thin film resistor and above the reflector can be easily controlled to substantially optimize the laser trimming efficiency of the thin film resistor.

26 Claims, 4 Drawing Sheets

METAL TRIM MIRROR FOR OPTIMIZED THIN FILM RESISTOR LASER TRIMMING

FIELD OF THE INVENTION

This invention relates generally to semiconductor processing, and in particular, to a device and method which improves the laser trimming of a thin film resistor.

BACKGROUND OF THE INVENTION

Thin film resistors are employed in many integrated circuits. These resistors are used in integrated circuits to implement the desired functionality of circuits, including biasing of active devices, serving as voltage dividers, assisting in impedance matching, etc. They are typically formed by deposition of a resistive material on a dielectric layer, and subsequently patterned to a desired size and shape. Deposition of the resistive material can be performed by any deposition means, such as by sputtering. Often, a thin film resistor is subjected to a heat treatment process (i.e. annealing) to improve its stability and to bring the resistance to a desired value range.

Although annealing a thin film resistor may alter its resistance to a desired value range, to achieve a precise value for the resistance, laser trimming of the thin film resistor is employed. Laser trimming of a thin film resistor consists of directing a laser beam upon the thin film resistor which causes a change in the thin film material. The change in the thin film material, in turn, causes a corresponding change of its resistance. Accordingly, laser trimming allows precise control of setting the desired resistance for the thin film resistor.

Typically, it is desirable that laser trimming of thin film resistors be performed in a substantially efficient manner. The efficiency of laser trimming of thin film resistor depends on the thickness, among other factors, of the dielectric situated directly below and supporting the thin film resistor. That is, given a particular thin film resistor material, a wavelength of the laser used in trimming the thin film resistor, and a particular material for the dielectric situated directly below and supporting the thin film resistor, there is a particular thickness of such dielectric material which optimizes the efficiency of laser trimming the thin film resistor.

However, achieving a desired thickness for such dielectric material may be difficult. Often, thin film resistors are disposed on interlayer dielectrics (ILDs), which in turn, are disposed on irregular topology. Accordingly, the dielectric thickness below various thin film resistors formed on the ILD may vary substantially. In addition, often such dielectric layers are subjected to chemical mechanical polishing (CMP), spin on glass (SOG) etchback, or other planarization techniques. Such techniques typically preclude the ability of accurate thickness control of the dielectric supporting the thin film resistor.

SUMMARY OF THE INVENTION

An aspect of the invention relates to a device comprising a reflector, a first dielectric layer disposed on the reflector, and a thin film resistor disposed on the first dielectric layer. The reflector acts as a barrier between the thin film resistor and an underlying dielectric layer which may have a non-uniform thickness. Thus, the thickness control and uniformity of the dielectric layer underlying the reflector does not affect the laser trimming of the thin film resistor. In addition to serving as a barrier, the reflector reflects the trimming laser energy back towards the thin film resistor, thereby improving the efficiency of the laser trimming of the thin film resistor. Furthermore, the thickness of the first dielectric layer situated below the thin film resistor and above the reflector can be easily controlled to substantially optimize the laser trimming efficiency of the thin film resistor.

In the exemplary embodiment described herein, the reflector is made of a relatively high melting point material, such as a refractory metal. Examples of reflector materials include tungsten (W), molybdenum (Mo), tantalum (Ta), Rhenium (Re), and/or Niobium (Nb). The first dielectric layer situated below the thin film resistor and above the reflector may be formed of silicon dioxide ($SiO_2$), silicon nitride ($Si_3N_4$), and/or other suitable dielectric materials. The thin film resistor may be formed of chromium silicon (CrSi), nickel chromium (NiCr), tantalum nitride (TaN), and/or other suitable resistive materials.

In addition, the device may further comprise a second dielectric layer disposed over the thin film resistor. The thickness and other properties of the second dielectric layer may also be chosen so as to substantially optimize the laser trimming efficiency of the thin film resistor. The second dielectric layer may be formed of silicon dioxide ($SiO_2$), silicon nitride ($Si_3N_4$), and/or other suitable dielectric materials. The device may further comprise a metal-insulator-metal (MIM) capacitor in which one of its plates may be formed from the same layer that is used to form the reflector.

Another aspect of the invention relates to a method of forming such device. Other aspects, features and techniques of the invention will become apparent to one skilled in the relevant art in view of the following detailed description of the invention.

DETAILED DESCRIPTION OF THE INVENTION

Figure 1:
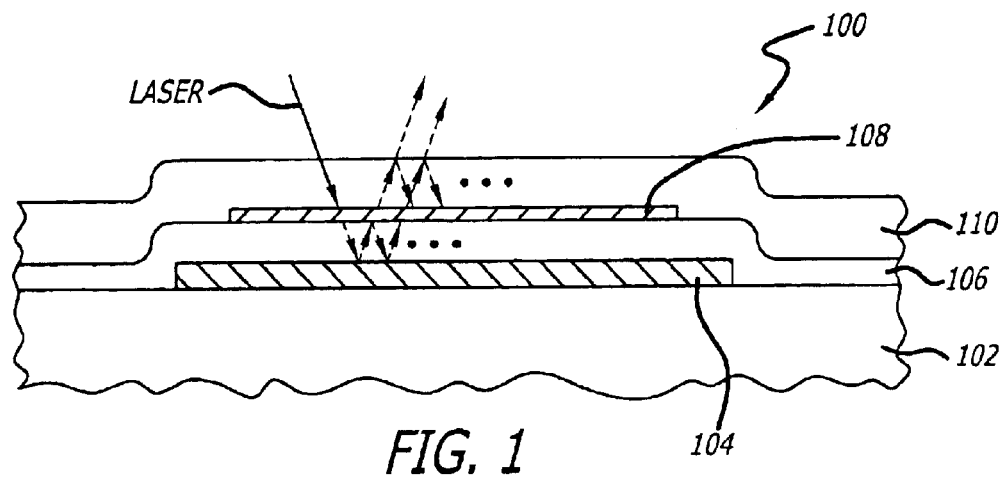
FIG. 1 illustrates a side cross-sectional view of an exemplary device having a thin film resistor in accordance with an embodiment of the invention.

FIG. 1 illustrates a side cross-sectional view of an exemplary device 100 having a thin film resistor in accordance with an embodiment of the invention. The device 100 comprises a first dielectric layer 102, a reflective layer (reflector) 104 situated over the dielectric layer 102, a second dielectric layer 106 situated over the reflective layer 104 and the first dielectric layer 102, a thin film resistor 108 situated over the second dielectric layer 106, and a third dielectric layer 110 situated over the thin film resistor 108.

The first dielectric layer 102 is typically an interlayer dielectric (ILD) or other dielectric layer. Typically, the thickness of the first dielectric layer 102 is difficult to control precisely. Therefore, for the sake of laser trimming efficiency, it would not be desirable to dispose the thin film resistor on such layer.

The reflective layer 104 should be substantially reflective to the laser energy used in laser trimming the thin film resistor 108. The reason being is that to improve the efficiency of laser trimming the thin film resistor 108, it is desirable for the laser energy that passes through the thin film resistor 108 to reflect off of the reflective layer 104 and to propagate back to the thin film resistor 108. In the exemplary embodiment, the reflective layer 104 may comprise a relatively high melting point refractory material to prevent melting of the reflective layer 104 during laser trimming of the thin film resistor 108. For instance, the reflective layer 104 may comprise a refractory metal, such as tungsten (W), molybdenum (Mo), tantalum (Ta), Rhenium (Re), Niobium (Nb), etc.

The deposition of the second dielectric layer 106 should be precisely controlled such that a particular thickness is achieved for the second dielectric layer 106 which substantially optimizes the efficiency of laser trimming the thin film resistor 108. Such thickness typically depends on the wavelength of the laser energy and the intrinsic properties of the second dielectric layer 106, such as its index of refraction and extinction coefficient. As illustrated in FIG. 1, the optimal thickness of the second dielectric layer 106 results in the incident laser energy and the reflective laser energy below the thin film resistor 108 constructively combining at the thin film resistor 108 to produce a more efficient trimming of the resistor. In the exemplary embodiment, the second dielectric layer 106 may comprise silicon dioxide ($SiO_2$) and/or silicon nitride ($Si_3N_4$).

The thin film resistor 108 may be formed of suitable thin film resistive material. For instance, the thin film resistor 108 may be comprised of chromium silicon (CrSi), nickel chromium (NiCr), tantalum nitride (TaN), and/or others.

The deposition of the third dielectric layer 110 should be precisely controlled such that a particular thickness is achieved for the third dielectric layer 110 which substantially optimizes the efficiency of the laser trimming of the thin film resistor 108. Such thickness typically depends on the wavelength of the laser energy and the intrinsic properties of the third dielectric layer 110, such as its index of refraction and extinction coefficient. As illustrated in FIG. 1, the optimal thickness of the third dielectric layer 110 results in the incident laser energy and the reflective laser energy above the thin film resistor 108 constructively combining at the thin film resistor 108 to produce a more efficient trimming of the resistor. In the exemplary embodiment, the third dielectric layer 110 may comprise silicon dioxide ($SiO_2$) and/or silicon nitride ($Si_3N_4$).

An advantage of the device 100 over prior art devices is that the thickness of the first dielectric layer 102 does not affect the laser trimming of the thin film resistor 108. This is because the reflective layer 104 acts as a barrier, for laser trimming purposes, between the first dielectric layer 102 and the thin film resistor 108. Thus, the thickness control of the first dielectric layer 102 need not be precise for resistor laser trimming purposes. A method of forming such a device is discussed below.

Figure 2A:
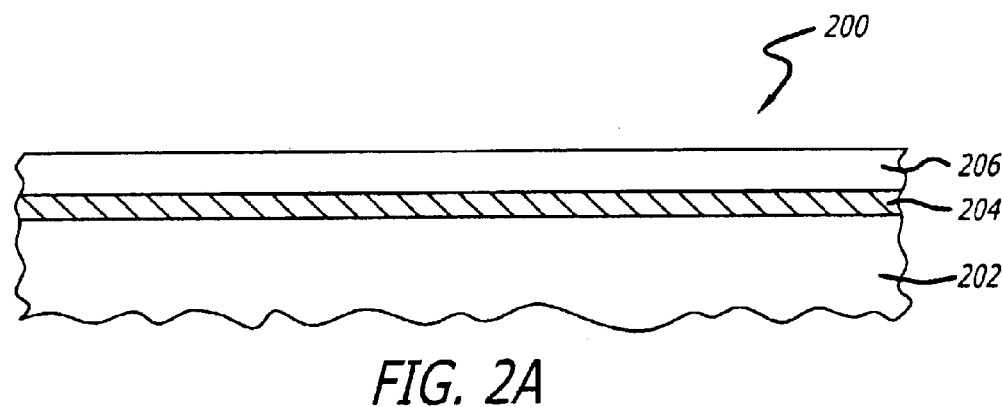
FIGS. 2A–E illustrate side cross-sectional views of an exemplary device at various stages pursuant to a method of forming such device in accordance with another embodiment of the invention.

FIG. 2A illustrates a side cross-sectional view of an exemplary device 200 at a particular stage pursuant to a method of forming such device in accordance with another embodiment of the invention. At this stage, the device 200 comprises a first dielectric layer 202, a reflective layer 204 disposed over the first dielectric layer 202, and a mask layer 206 disposed over the reflective layer 204. As previously discussed with reference to device 100, the first dielectric layer 202 may be an interlayer dielectric (ILD) or other dielectric layer, which need not have a precise thickness for resistor laser trimming purposes. The reflective layer 204 may be comprised of a relatively high melting point material, such as a refractory metal. The mask layer 206 may be of a suitable material (e.g. photoresist) to serve as a mask in the etching of the reflective layer 204.

Figure 2B:
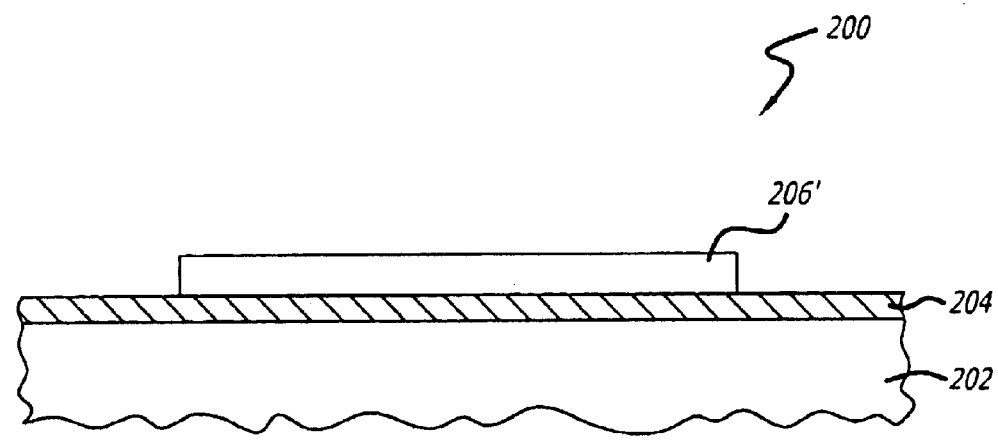

FIG. 2B illustrates a side cross-sectional view of an exemplary device 200 at a subsequent stage pursuant to a method of forming such device in accordance with another embodiment of the invention. According to the method, the mask layer 206 is patterned and developed to form a mask 206' which is used to define the to-be formed reflector. Then the device 200 is subjected to an etching process to substantially remove all of the reflective layer 204 except that portion underlying the mask 206'. This etching process forms a reflector 204' used to improve the efficiency in laser trimming of a thin film resistor.

Figure 2C:
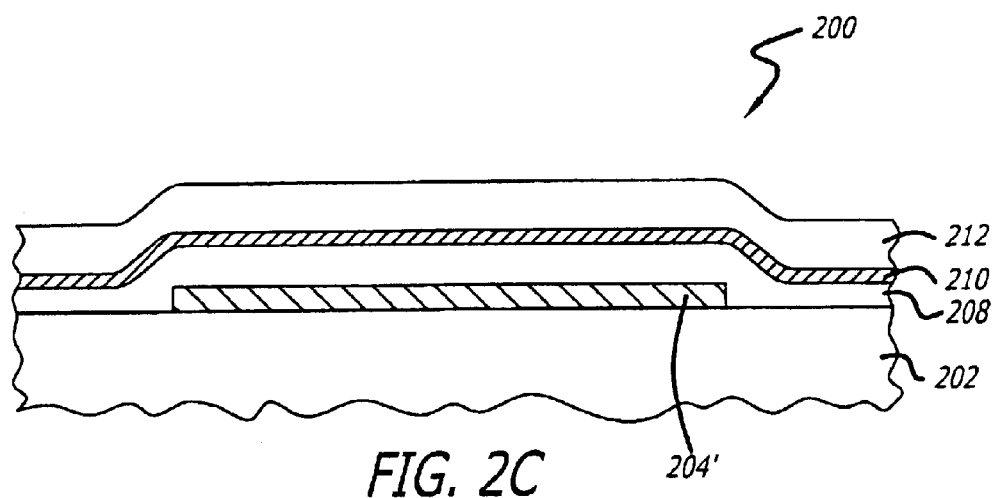

FIG. 2C illustrates a side cross-sectional view of an exemplary device 200 at a subsequent stage pursuant to a method of forming such device in accordance with another embodiment of the invention. According to the method, the mask 206' is removed. Then, a second dielectric layer 208 is formed over the reflector 204' and the first dielectric layer 202, a thin film resistive layer 210 is formed over the second dielectric layer 208, and a mask layer 212 is formed over the thin film resistive layer 210. As previously discussed with reference to device 100, the second dielectric layer 208 may be formed of suitable dielectric material, such as $SiO_2$ and/or $Si_3N_4$. The thin film resistive layer 210 may be formed of suitable resistive material, such as CrSi, NiCr, and/or TaN. The mask layer 212 may be of a suitable material (e.g. photoresist) to serve as a mask in the etching of the thin film resistive layer 210.

Figure 2D:
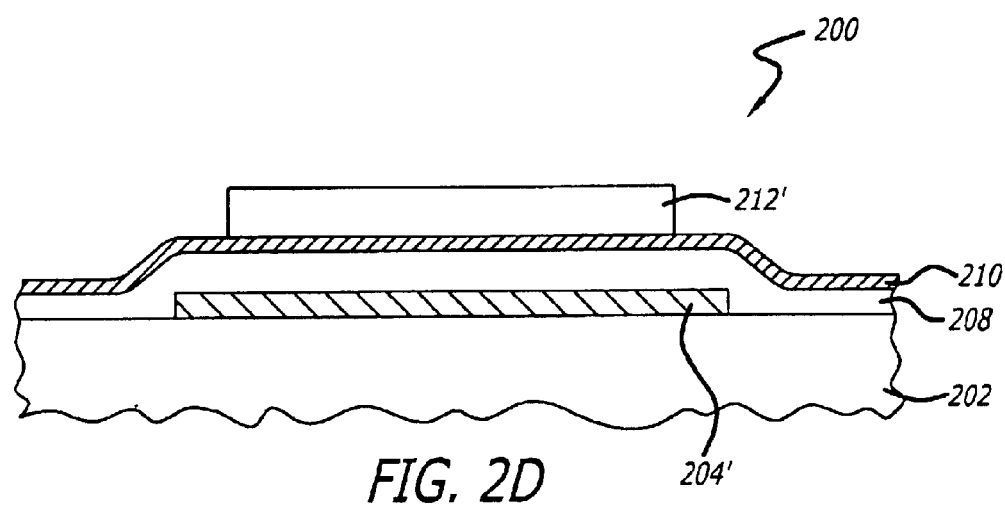
Figure 2E:
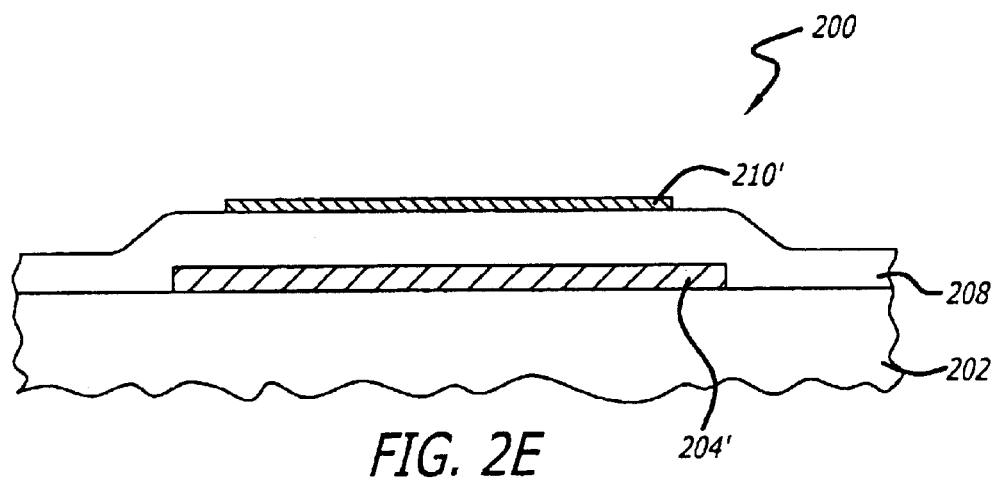

FIG. 2D illustrates a side cross-sectional view of an exemplary device 200 at a subsequent stage pursuant to a method of forming such device in accordance with another embodiment of the invention. According to the method, the mask layer 212 is patterned and developed to form a mask 212' which is used to define the to-be formed thin film resistor. Then the device 200 is subjected to an etching process to substantially remove all of the thin film resistive layer 210 except that portion underlying the mask 212'. This etching process forms a thin film resistor 210' (see FIG. 2E). Subsequent to the formation of the thin film resistor 212', a third dielectric layer is formed over the thin film resistor, such as dielectric layer 110 shown in FIG. 1.

Figure 3:
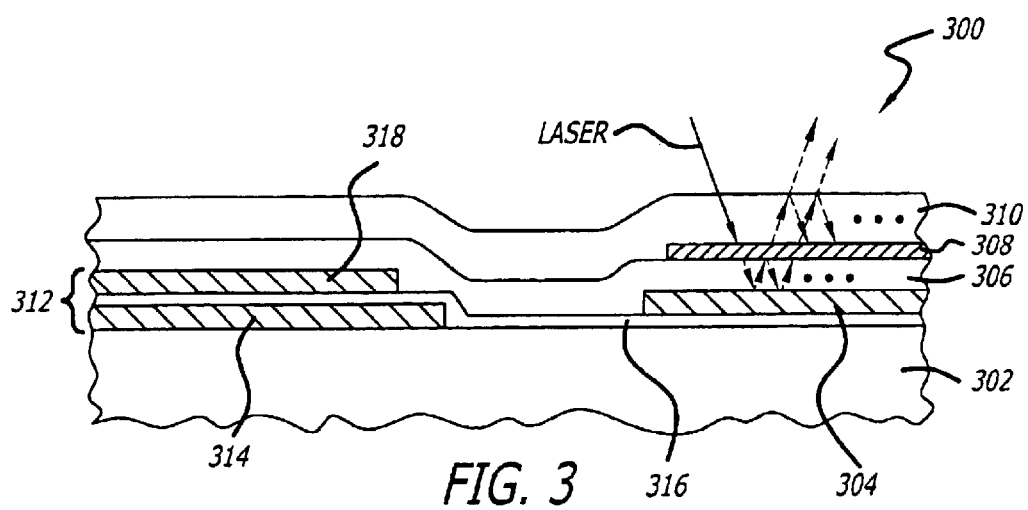
FIG. 3 illustrates a side cross-sectional view of another exemplary device having a thin film resistor in accordance with another embodiment of the invention.

FIG. 3 illustrates a side cross-sectional view of another exemplary device 300 having a thin film resistor in accordance with another embodiment of the invention. The device 300 is similar to that of device 100. Accordingly, elements common to both devices 100 and 300 have the same reference numbers, except that the most significant digit is "1" in the case of device 100 and "3" in the case of device 300. Thus, the device 300 comprises a first dielectric layer 302, a reflective layer (reflector) 304 situated over the first dielectric layer 302, a second dielectric layer 306 situated over the reflective layer 304, a thin film resistor 308 situated over the second dielectric layer 306, and a third dielectric layer 310 situated over the thin film resistor 308.

The device 300 differs from device 200 in that device 300 further comprises a metal-insulator-metal (MIM) capacitor 312. In this example, the MIM capacitor 312 comprises a lower conductive plate 314, a dielectric 316, and an upper conductive plate 318. The upper conductive plate 318 is formed from the same layer used to form the reflector 304. This illustrates that other features of the device may be formed using the reflective layer 304. The dielectric layer 316 used in the MIM capacitor 312 may also be formed between the first dielectric layer 302 and the reflective layer 304. An example of a method of forming such a device is discussed below.

Figure 4A:
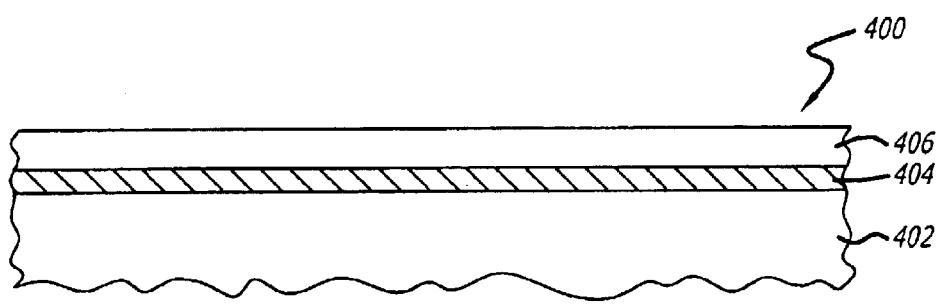
FIGS. 4A–F illustrate side cross-sectional views of another exemplary device at various stages pursuant to another method of forming such device in accordance with another embodiment of the invention.

FIG. 4A illustrates a side cross-sectional view of an exemplary device 400 at a particular stage pursuant to a method of forming such device in accordance with another embodiment of the invention. At this stage, the device 400 comprises a first dielectric layer 402, an electrically-conductive layer 404 disposed over the first dielectric layer 402, and a mask layer 406 disposed over the electrically-conductive layer 404. As previously discussed, the first dielectric layer 402 may be an interlayer dielectric (ILD) or other dielectric layer, which need not have a precise thickness for resistor laser trimming purposes. The electrically-conductive layer 404 may be comprised of a metallization layer and/or a doped polycrystalline ("polysilicon") layer. The mask layer 406 may be of a suitable material (e.g. photoresist) to serve as a mask in the etching of the electrically-conductive layer 404.

Figure 4B:
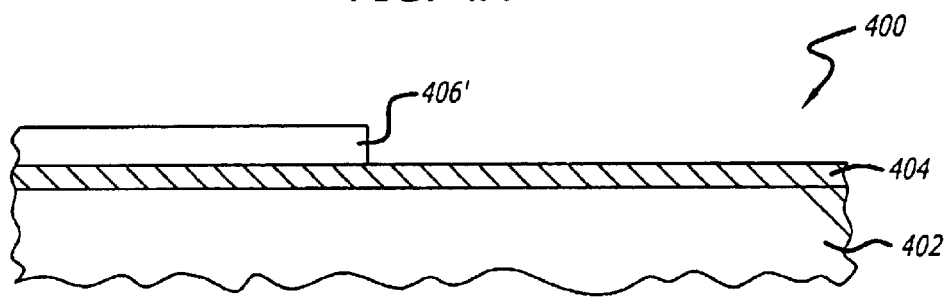

FIG. 4B illustrates a side cross-sectional view of an exemplary device 400 at a subsequent stage pursuant to a method of forming such device in accordance with another embodiment of the invention. According to the method, the mask layer 406 is patterned and developed to form a mask 406' which is used to define the to-be formed lower plate of the MIM capacitor. Then the device 400 is subjected to an etching process to substantially remove all of the electrically-conductive layer 404 except that portion underlying the mask 406'. This etching process forms a lower plate 404' of the to-be formed MIM capacitor.

Figure 4C:
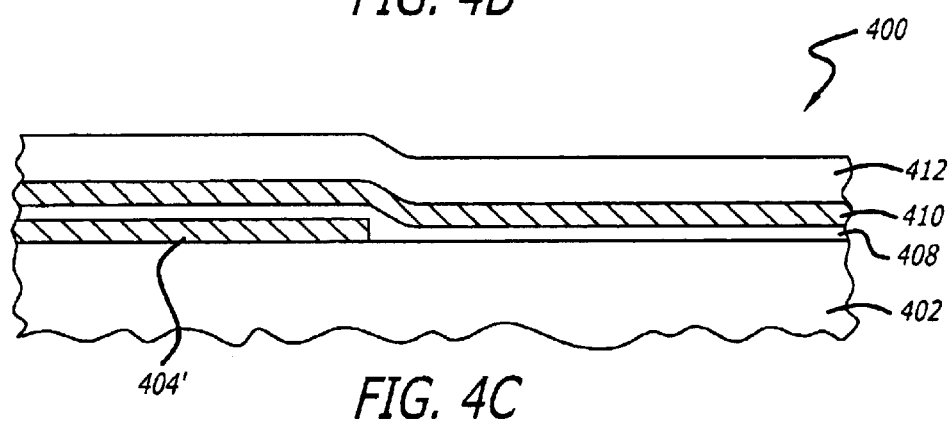

FIG. 4C illustrates a side cross-sectional view of an exemplary device 400 at a subsequent stage pursuant to a method of forming such device in accordance with another embodiment of the invention. According to the method, the mask 406' is removed. Then, a second dielectric layer 408 is formed over the lower plate 404' of the to-be formed MIM capacitor and the first dielectric layer 402. Then, an electrically-conductive reflective layer 410 is formed over the second dielectric layer 408, and a mask layer 412 is formed over the electrically-conductive reflective layer 410. As previously discussed, the second dielectric layer 208 serves as the dielectric for the to-be formed MIM capacitor, and may be formed of a suitable dielectric material, such as SiO$_2$ and/or Si$_3$N$_4$. The electrically-conductive reflective layer 410 may be comprised of a relatively high melting point material, such as a refractory metal. The mask layer 412 may be of a suitable material (e.g. photoresist) to serve as a mask in the etching of the electrically-conductive reflective layer 410.

Figure 4D:
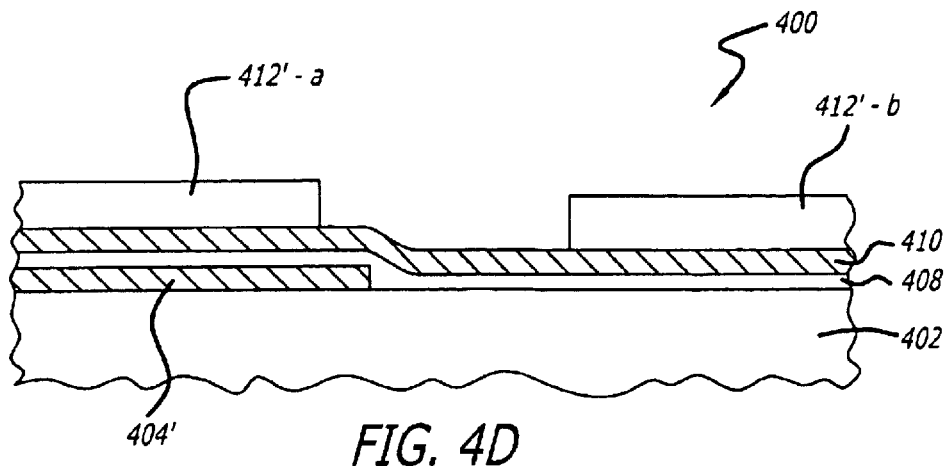

FIG. 4D illustrates a side cross-sectional view of an exemplary device 400 at a subsequent stage pursuant to a method of forming such device in accordance with another embodiment of the invention. According to the method, the mask layer 412 is patterned and developed to form a mask 412'-a that is used to define the to-be formed upper plate of the to-be formed MIM capacitor, and a mask 412'-b that is used to define the to-be formed reflector. Then the device 400 is subjected to an etching process to substantially remove all of the reflective layer 410 except those portions underlying the respective masks 412'a–b. This etching process forms the upper plate 410'-a of the MIM capacitor and the reflector 410'-b.

Figure 4E:
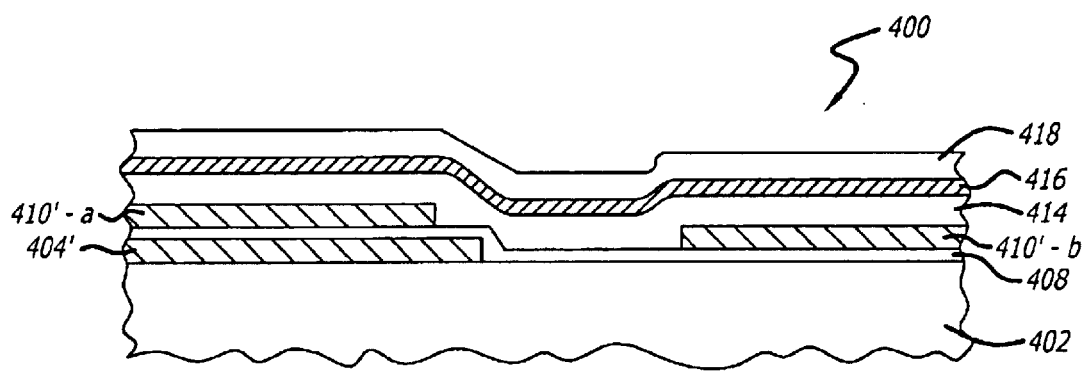

FIG. 4E illustrates a side cross-sectional view of an exemplary device 400 at a subsequent stage pursuant to a method of forming such device in accordance with another embodiment of the invention. According to the method, a third dielectric layer 414 is formed over the upper plate 410'-a of the MIM capacitor, the second dielectric layer 408, and the reflector 410'-b. Then, a thin film resistive layer 416 is formed over the third dielectric layer 414, and a mask 418 is formed over the thin film resistive layer 416. As previously discussed, the third dielectric layer 414 may be formed of a suitable dielectric material; such as SiO$_2$ and/or Si$_3$N$_4$. Also, the thickness of the third dielectric layer 414 should be such as to optimize the laser trimming of the to-be formed thin film resistor. The thin film resistive layer 416 may be formed of suitable resistive material, such as CrSi, NiCr, and/or TaN. The mask layer 418 may be of a suitable material (e.g. photoresist) that serves as a mask in the etching of the thin film resistive layer 416.

Figure 4F:
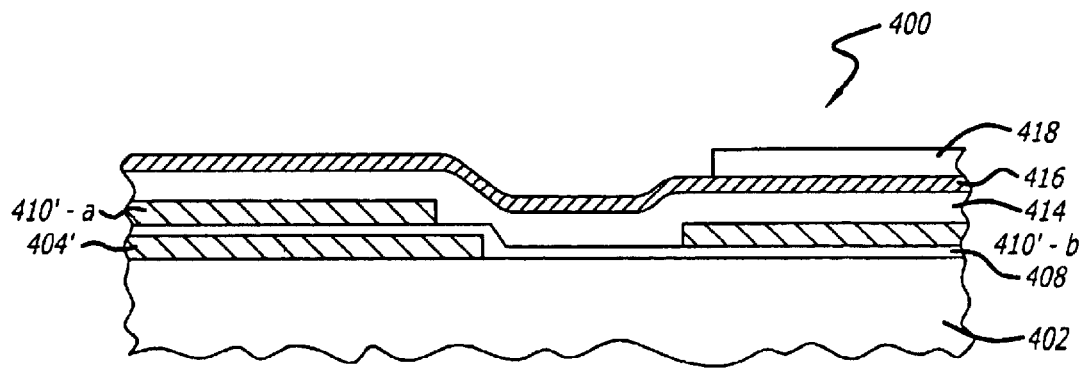

FIG. 4F illustrates a side cross-sectional view of an exemplary device 400 at a subsequent stage pursuant to a method of forming such device in accordance with another embodiment of the invention. According to the method, the mask layer 418 is patterned and developed to form a mask 418' which is used to define the to-be formed thin film resistor. Then the device 400 is subjected to an etching process to substantially remove all of the thin film resistive layer 416 except that portion underlying the mask 418'. This etching process forms thin film resistor 308 (See FIG. 3). Subsequent to the formation of the thin film resistor 308, a third dielectric layer is formed over the thin film resistor, such as dielectric layer 310 shown in FIG. 3.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

It is claimed:

1. A device comprising:
   a refractory metal reflector; the refractory metal comprising tungsten (W), molybdenum (Mo), tantalum (Ta), Rhenium (Re), and/or Niobium (Nb),
   a first dielectric layer disposed over the reflector; and
   a thin film resistor formed over the first dielectric layer.

2. The device of claim 1, wherein said reflector substantially reflects a laser energy used to laser trimming said thin film resistor.

3. The device of claim 1, wherein the thickness of said first dielectric layer is at a pre-determined thickness range which optimizes the laser trimming of said thin film resistor.

4. The device of claim 1, wherein said first dielectric layer comprises silicon dioxide (SiO$_2$) and/or silicon nitride (Si$_3$N$_4$).

5. The device of claim 1, wherein said thin film resistor comprises chromium silicon (CrSi), nickel chromium (NiCr), and/or tantalum nitride (TaN).

6. The device of claim 1, further comprising a second dielectric layer disposed over the thin film resistor.

7. The device of claim 6, wherein the thickness of said second dielectric layer is at a pre-determined thickness range which optimizes the laser trimming of said thin film resistor.

8. The device of claim 7, wherein said second dielectric layer comprises silicon dioxide (SiO$_2$) and/or silicon nitride (Si$_3$N$_4$).

9. A device comprising:
   a reflector;
   a dielectric layer disposed over the reflector;

a thin film resistor formed over the dielectric layer, and a metal-insulator-metal (MIM) capacitor.

10. The device of claim 9, wherein a plate of said MIM capacitor is the same layer as that of said reflector.

11. The device of claim 10, wherein said plate comprises an upper plate of said MIM capacitor.

12. A method comprising:
   forming a reflector comprising:
      forming a reflective layer;
      forming a mask layer over said reflective layer;
      patterning and developing said mask layer to form a mask; and
      etching said reflective layer except a portion underlying said mask, wherein said portion of said reflective layer comprises said reflector,
   forming a dielectric layer over said reflector; and
   forming a thin film resistor over said dielectric layer.

13. The method of claim 12, wherein said reflective layer comprises a refractory metal.

14. The method of claim 13, wherein said refractory metal comprises tungsten (W), molybdenum (Mo), tantalum (Ta), Rhenium (Re), and/or Niobium (Nb).

15. The method of claim 12, further comprising directing a laser energy to trim said thin film resistor, wherein said reflector substantially reflects said laser energy towards said thin film resistor.

16. The method of claim 15, wherein the thickness of said first dielectric layer is at a pre-determined thickness range which optimizes the laser trimming of said thin film resistor.

17. The method of claim 12, wherein said dielectric layer comprises silicon dioxide ($SiO_2$) and/or silicon nitride ($Si_3N_4$).

18. A method comprising:
   forming a reflector;
   forming a first dielectric layer over said reflector; and
   forming a thin film resistor over said first dielectric layer comprising
      forming a thin film resistive layer over said first dielectric layer;
      forming a mask layer over said thin film resistive layer;
      patterning and developing said mask layer to form a mask; and
      etching said thin film resistive layer except a portion under said mask, wherein said portion comprises said thin film resistor.

19. The method of claim 18, wherein said thin film resistive layer comprises chromium silicon (CrSi), nickel chromium (NiCr), and/or tantalum nitride (TaN).

20. The method of claim 18, further comprising forming a second dielectric layer over said thin film resistor.

21. The method of claim 20, further comprising directing a laser energy to said thin film resistor, wherein the thickness of said second dielectric layer is at a predetermined range which optimizes the laser trimming of said thin film resistor.

22. The method of claim 20, wherein said second dielectric layer comprises silicon dioxide ($SiO_2$) and/or silicon nitride ($Si_3N_4$).

23. A method comprising:
   forming a reflector;
   forming a dielectric layer over said reflector;
   forming a thin film resistor over said dielectric layer, and
   forming a metal-insulator-metal (MIM) capacitor.

24. The method of claim 23, wherein forming said MIM capacitor comprises:
   forming a first capacitor plate;
   forming a second capacitor plate; and
   forming an insulating layer between said first and second capacitor plates.

25. The method of claim 24, wherein forming said second capacitor plate comprises:
   forming an electrically-conductive layer;
   forming a mask layer over said electrically-conductive layer;
   patterning and developing said mask layer to form first and second masks; and
   etching said electrically-conductive layer except first and second portions thereof which respectively underlie said first and second masks, wherein said first portion comprises said second capacitor plate and said second portion comprises said reflector.

26. The method of claim 25, wherein said second capacitor plate comprises an upper capacitor plate of said MIM capacitor.

* * * * *